United States Patent
Anderton et al.

(10) Patent No.: US 6,402,862 B1
(45) Date of Patent: Jun. 11, 2002

(54) METHOD OF HARDENING A BUSHING OF A TRACK CHAIN

(75) Inventors: Peter W. Anderton, Peoria; Fredric A. Woldow, Morton, both of IL (US); Dennis C. Pond, Saltburn by the Sea (GB); Timothy G. Van Den Avond, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/652,266

(22) Filed: Aug. 31, 2000

(51) Int. Cl.$^7$ ................................................. C21D 1/42
(52) U.S. Cl. ........................ 148/570; 148/571; 148/575; 148/594
(58) Field of Search ............................... 148/570, 571, 148/575, 594

(56) References Cited

U.S. PATENT DOCUMENTS

| | | | |
|---|---|---|---|
| 4,036,482 A | 7/1977 | Kieferle | |
| 4,807,853 A | 2/1989 | Murakami et al. | |
| 5,049,207 A | * 9/1991 | Sahara et al. | 148/150 |
| 5,264,053 A | * 11/1993 | Nakajima et al. | 148/570 |
| 5,268,040 A | 12/1993 | Naito et al. | |
| 5,324,009 A | 6/1994 | Kemp | |
| 5,702,667 A | 12/1997 | Pond | |
| 6,048,417 A | * 4/2000 | Pond | 148/570 |

* cited by examiner

Primary Examiner—Scott Kastler
(74) Attorney, Agent, or Firm—Maginot, Addison & Moore

(57) ABSTRACT

A method of hardening a work piece having (i) an outer surface, (ii) an inner surface which defines a passageway extending through the work piece, and (iii) an end. The method includes the steps of (A) advancing the work piece through a first induction coil such that a first hardened area is formed on the work piece, (B) advancing a second induction coil into the passageway of the work piece such that a second hardened area is formed on the work piece, and (C) positioning a third induction coil adjacent to the end of the work piece such that a third hardened area is formed on the work piece. The positioning the third induction coil step is performed after (i) the advancing the work piece through the first induction coil step and (ii) the advancing a second induction coil into the passageway step.

7 Claims, 4 Drawing Sheets

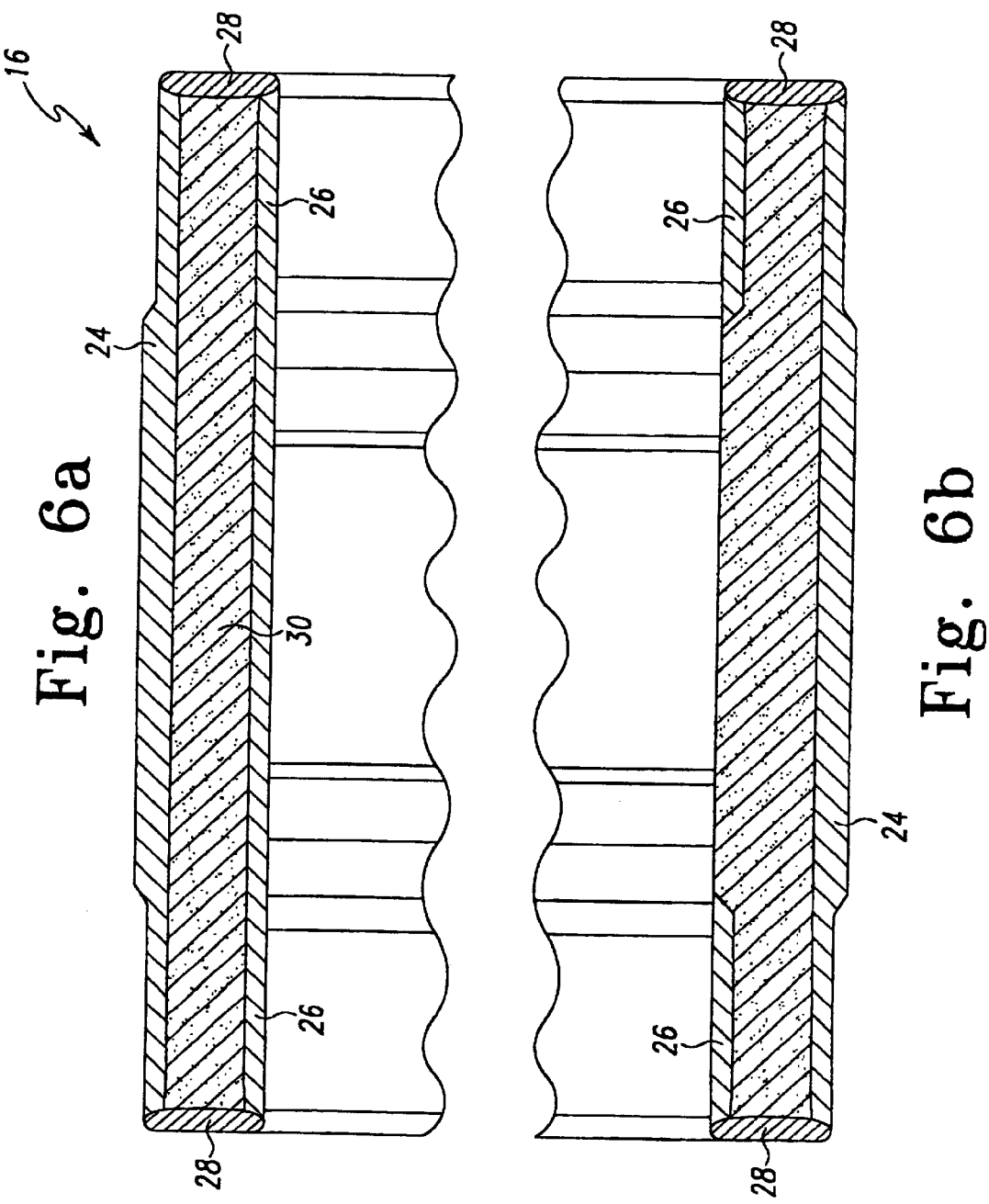

METHOD OF HARDENING A BUSHING OF A TRACK CHAIN

TECHNICAL FIELD

The present invention generally relates to a method of hardening a work piece, and more particularly relates to a method of hardening a bushing of a track chain.

BACKGROUND ART

Some work machines, such as a bulldozer, typically have a sprocket, an idler, a track chain, and a number of track shoes attached to the track chain for propelling the work machine over the ground. Track chains generally include a pair of parallel chains, with each parallel chain being made up of a series of entrained track links. Track chains further include a number of pin and bushing assemblies in which a pin is positioned within a passageway defined in a bushing. Each pin and bushing assembly is interposed and connected to the parallel chains.

During use of the work machine the sprocket rotates and engages the bushings of the track chain, thereby causing the track chain to rotate around a path defined by the sprocket and the idler. The rotation of the track chain causes the track shoes to engage the ground, thereby propelling the work machine over the ground to perform various work functions.

A problem with the above described arrangement is that the bushings are subjected to many cyclic loads as the track chain is rotated around the sprocket and the idler. For example, as the track chain rotates around sprocket and the idler, the inner diameter of each bushing is subjected to cyclic loads from the pin as the bushing rotates relative to the pin. In addition, the outer diameter of each bushing encounters cyclic loads as each bushing engages the sprocket. The cyclic loads cause the bushings to wear which increases the cost of maintaining the work machine.

One way of reducing the wear of the bushings is to subject them to a hardening process. For example, U.S. Pat. No. 5,702,667 discloses an apparatus for simultaneously heat treating the outer peripheral surface and the inner circumferential surface of a bushing. However, the process described in the U.S. Pat. No. 5,702,667 does suffer from the drawback that it is difficult to control the characteristics of the resulting hardened areas when the outer peripheral surface and the inner circumferential surface are simultaneously heat treated. In addition, the process described in the U.S. Pat. No. 5,702,667 relies on the treatment of the outer peripheral surface and the inner circumferential surface to produce hardened areas at the ends of the bushing. However, the reliance on the treatment of the outer peripheral surface and the inner circumferential surface makes it difficult to control the characteristics of the hardened areas created on the ends of the bushing. For example, the hardened areas created on the ends of the bushing tend to extend to far into the hardened areas created on the outer peripheral surface and the inner circumferential surface and thus create exposed softened areas in the outer peripheral surface and the inner circumferential surface. These created softened areas are subject to excessive wear which in turn increases the cost of maintaining the work machine.

What is needed therefore is a method for hardening a bushing which overcomes one or more the above-mentioned drawbacks.

DISCLOSURE OF THE INVENTION

In accordance with one embodiment of the present invention, there is provided a method of hardening a work piece having (i) an outer surface, (ii) an inner surface which defines a passageway extending through the work piece, and (iii) an end. The method includes the steps of (A) advancing the work piece through a first induction coil such that a first hardened area is formed on the work piece, (B) advancing a second induction coil into the passageway of the work piece such that a second hardened area is formed on the work piece, and (C) positioning a third induction coil adjacent to the end of the work piece such that a third hardened area is formed on the work piece. The positioning the third induction coil step is performed after (i) the advancing the work piece through the first induction coil step and (ii) the advancing a second induction coil into the passageway step.

In accordance with another embodiment of the present invention, there is provided a track chain. The track chain includes a bushing having (i) an outer surface, (ii) an inner surface which defines a passageway extending through the bushing, and (iii) an end. The bushing is prepared by a process including the steps of (i) advancing the bushing through a first induction coil such that a first hardened area is formed on the bushing, (ii) advancing a second induction coil into the passageway of the bushing such that a second hardened area is formed on the bushing, and (iii) positioning a third induction coil adjacent to the end of the bushing such that a third hardened area is formed on the bushing. The positioning the third induction coil step is performed after (i) the advancing the bushing through the first induction coil step and (ii) the advancing a second induction coil into the passageway step.

In accordance with yet another embodiment of the present invention, there is provided a work machine. The work machine has a track chain which includes a bushing having (i) an outer surface, (ii) an inner surface which defines a passageway extending through the bushing, and (iii) an end. The bushing is prepared by a process including the steps of (i) advancing the bushing through a first induction coil such that a first hardened area is formed on the bushing, (ii) advancing a second induction coil into the passageway of the bushing such that a second hardened area is formed on the bushing, and (iii) positioning a third induction coil adjacent to the end of the bushing such that a third hardened area is formed on the bushing. The positioning the third induction coil step is performed after (i) the advancing the bushing through the first induction coil step and (ii) the advancing a second induction coil into the passageway step. The work machine also includes a sprocket positioned in contact with the track chain.

BRIEF DESCRIPTION OF THE DRAWINGS

FIG. 6a shows the bushing of FIG. 1 after the entire inner diameter thereof was subjected to a hardening treatment; and FIG. 6b shows the bushing of FIG. 1 after selected portions of the inner diameter thereof was subjected to a hardening treatment.

BEST MODE FOR CARRYING OUT THE INVENTION

Figure 1:
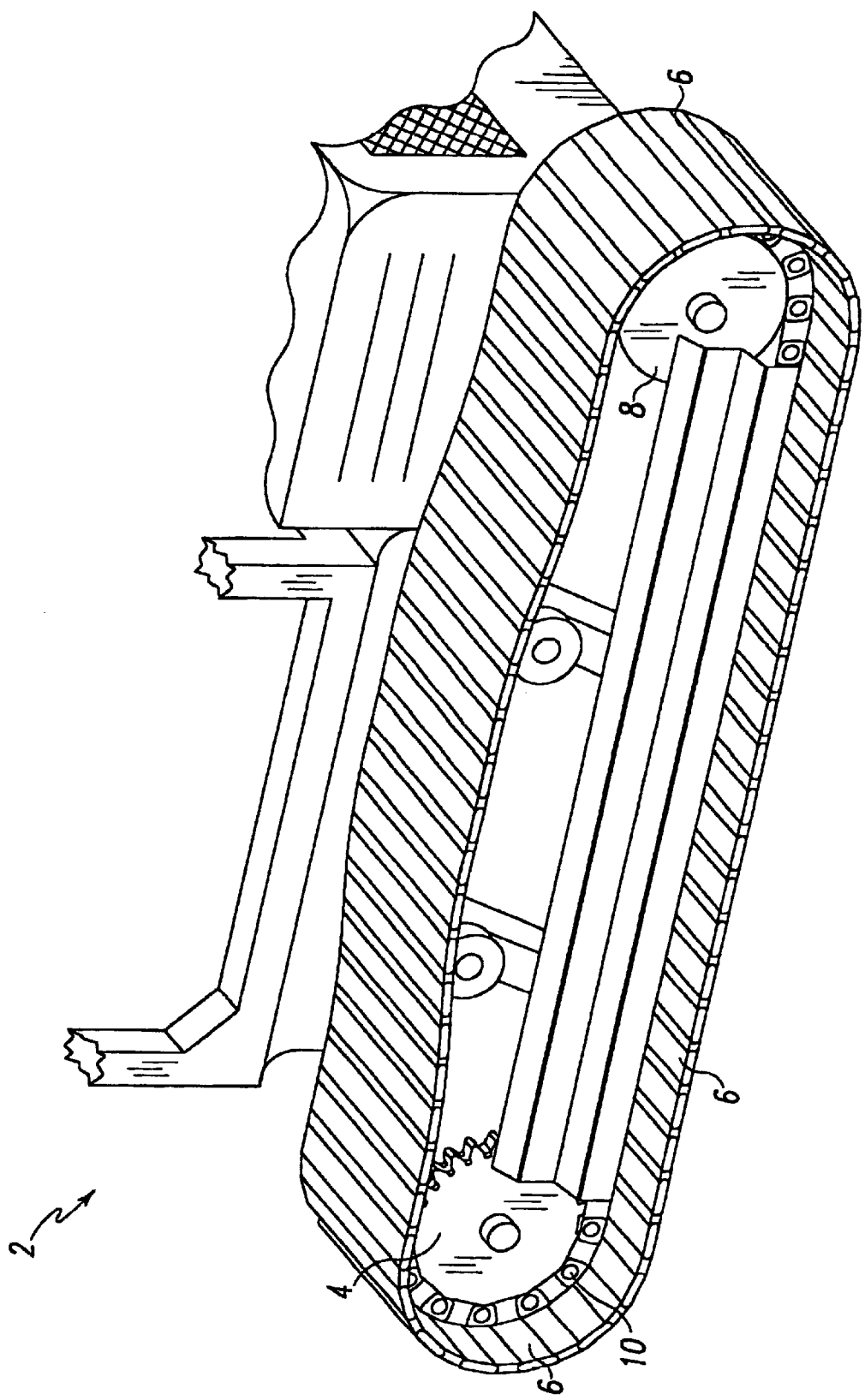
FIG. 1 is a fragmentary perspective view of a work machine having track shoes coupled to a track chain which incorporates the features of the present invention therein.

Referring to FIG. 1, there is shown a work machine 2 having a sprocket 4, an idler 8, and a number of track shoes 6 attached to a track chain 10. In order to propel work machine 2 over the ground sprocket 4 rotates and engages track chain 10. This engagement and rotation causes track chain 10, along with the attached track shoes 6, to rotate around a path defined by sprocket 4 and idler 8. Rotation of track chain 10 and track shoes 6 around this path causes the track shoes 6 to engage the ground. The engagement of track shoes 6 with the ground causes the work machine 2 to be propelled over the ground to perform various work functions.

Figure 2:
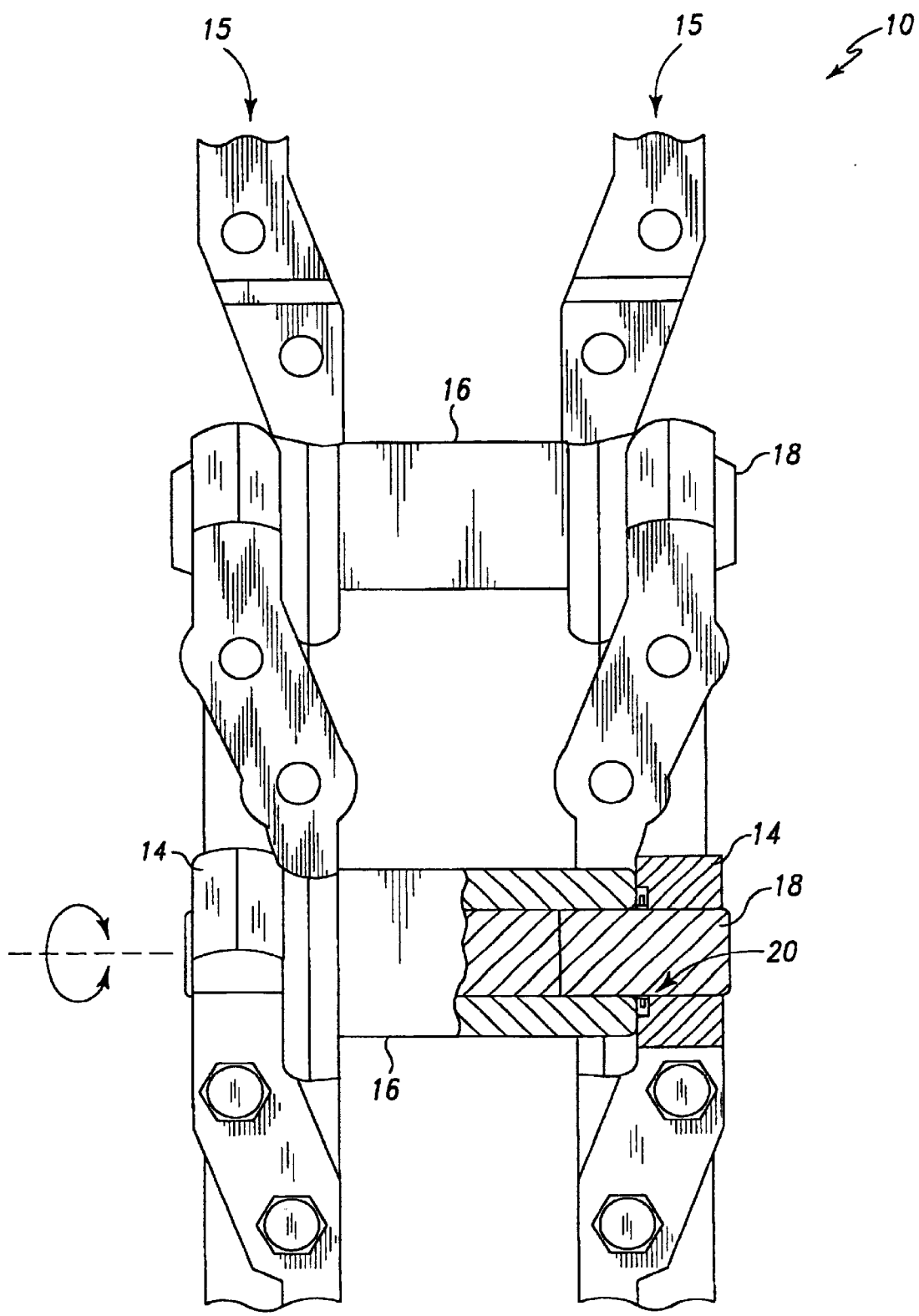
FIG. 2 is a fragmentary elevational view of the track chain of FIG. 1 (note that the track shoes have been removed and part of the track chain is shown in a cross sectional view for clarity of description)

Referring to FIG. 2, there is shown a section of track chain 10 of FIG. 1, with track shoes 6 removed for clarity of description. Track chain 10 includes a series of track links 14 entrained to form a pair of parallel chains 15. Track chain 10 also includes a series of cylindrically shaped bushings 16 and track pins 18 interposed and connecting parallel chains 15. Bushing 16 and track link 14 cooperate to form an annular track joint 20 which surrounds a track pin 18 contained within bushing 16 and track link 14. Track joint 20 allows bushing 16 to rotate relative track link 14 and track pin 18 in the directions indicated by arrow 70 during use of track chain 10.

Figure 3:
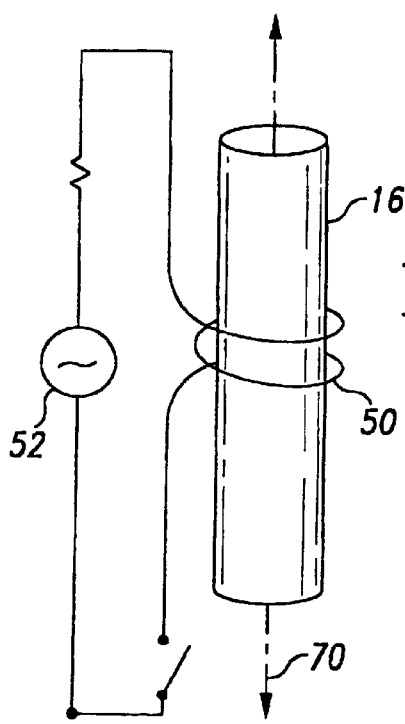
FIG. 3 illustrates the bushing of FIG. 1 as it is subjected to a hardening treatment on an outer diameter thereof.
Figure 4:
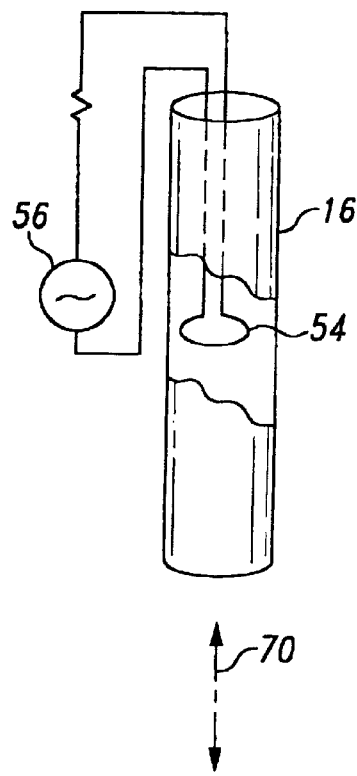
FIG. 4 illustrates the bushing of FIG. 1 as it is subjected to a hardening treatment on an inner diameter thereof.
Figure 5:
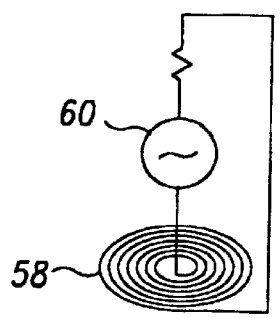
FIG. 5 illustrates the bushing of FIG. 1 as it is subjected to a hardening treatment on an end face thereof.
Figure 5:
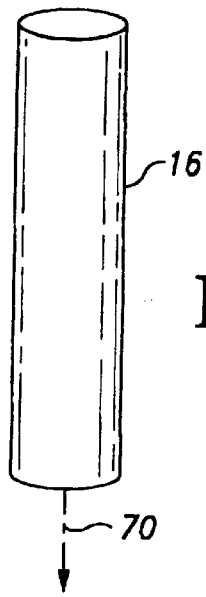

As shown in FIGS. 3, 4, and 5, bushing 16 is subjected to a hardening treatment prior to being incorporated into track chain 10. In particular, the outer diameter (i.e. the outer surface; see FIG. 3), the inner diameter (i.e. the inner surface; see FIG. 4), and the end shots or ends (see FIG. 5) of bushing 16 are subjected to a hardening treatment prior to being incorporated into track chain 10.

It should be appreciated that the hardening treatment utilized in the present invention can be any treatment which serves to increase the hardness of the treated metal of a work piece, such as bushing 16. For example, one such treatment which can be utilized in the present invention is induction hardening. In induction hardening a coil is energized thereby generating a main magnetic field. When a conductive material, such as metal, is placed in this main magnetic field, eddy currents are induced in the metal which results in the generation of heat. In addition, the induced eddy currents generate their own magnetic field in opposition to the main magnetic field, which causes the current to predominately concentrate toward the surface of the work piece which is adjacent to the coil. As a result, the current causes heat generation in the aforementioned surface of the work piece.

It should be appreciated that by utilizing the above described procedure, electrically conductive materials can be precisely inductively heated and hardened by selecting an appropriate intensity and frequency of current. For example, as shown in FIG. 3, bushing 16 is placed on a vertical scanner such that the vertical axis 70 of bushing 16 is aligned with the vertical path of the scanner. One scanner which can be utilized in the present invention is commercially available from Inductoheat, located at 32251 N. Avis Drive, Madison Heights, Michigan 48071 as part No. 32020-028. Bushing 16 is also loaded on the scanner such that it rests below an induction coil 50. Coil 50 is preferably a two turn copper tubing with a coil coupling of 0.065". The coil also has an associated scan quench (not shown). Bushing 16 is initially scanned up through the coil 50 so that coil 50 is located adjacent the lower end of bushing 16. Once bushing 16 has been scanned up through coil 50 in the above described manner, coil 50 is energized via an electrically coupled power supply 52. It should be appreciated that power supply 52 is of the power and frequency which is proper for the metal of bushing 16, e.g. bushing 16 can be made from SAE 1060—modified. For example, the power and frequency setting for the outer diameter of bushing 16 can be about 160–200 KW at about 10 KHz. Bushing 16 is then rotated around vertical axis 70 to ensure that all intended areas of the outer diameter will be equally exposed to the induction hardening treatment. An exemplary speed of rotation is 120 rpm.

Once the coil 50 is powered and the bushing 16 is rotating, the vertical scanner begins to scan the bushing 16 downward into the opening of coil 50 (FIG. 3). The scanning is done at a constant speed to again ensure uniform coverage of the outer diameter of bushing 16. For example, the speed used for the scanning in this process can be from about 0.12 to about 0.15 inches per second. As bushing 16 passes through coil 50, it is heated due to induction from coil 50. The heating allows the metal to enter different phases of composition to arrive at a desired microstructure composition such as austenite.

After the heating, bushing 16 is quenched by a scan quench to arrest the phase transitioning at a harder microstructure such as martensite and render the metal harder. Quenching, by the scan quench, can be done by liquid quenching using oil, water based polymers, or similar quenchants. It should be appreciated that the above described procedure creates a hardened area 24 on bushing 16 as shown in FIGS. 7a and 7b.

As shown in FIG. 4, inner diameter of bushing 16 is subjected to an induction hardening treatment similar to the treatment of the outer diameter of bushing 16. The treatment of the inner diameter also utilizes the aforementioned vertical scanner. However, when treating the inner diameter of bushing 16 a coil 54 is utilized. Coil 54 can be a single turn copper tubing with laminations and a coil coupling of 0.080". Coil 54 also has an associated scan quench (not shown).

When treating the inner diameter of bushing 16, bushing 16 is placed on the vertical scanner such that the vertical axis 70 of bushing 16 is aligned with the vertical path of the scanner. Bushing 16 is also positioned on the scanner so that coil 54 is (i) located within the passageway of bushing 16 and (ii) positioned adjacent the lower end of the passageway of bushing 16. Once positioned in the aforementioned manner, coil 54 is energized by an electrically coupled power supply 56 having the power and frequency which is proper for the metal of bushing 16. Such a power and frequency setting for inner diameter is about 225–250 KW at about 1 KHz.

Bushing 16 is then rotated about its vertical axis 70 to ensure that all intended areas of inner diameter will be equally exposed to treatment. An exemplary speed of rotation is 120 rpm. Once the coil 54 is energized and the bushing 16 is rotating, the vertical scanner begins to scan bushing 16 downward relative to coil 54. Again, the bushing is lowered at a constant speed to ensure uniform exposure of the inner diameter. The speed used for the scanner in this process can be about 0.3 to about 0.4 inches per second. As coil 54 passes by the inner diameter of bushing 16 the inner diameter is heated due to induction.

As previously discussed, the heating allows the treated metal to enter different phases of composition to arrive at a microstructure composition such as austenite. After the heating, bushing 16 is quenched with a scanning quench to arrest the phase transitioning at a desired microstructure such as martensite. The scan quench, may utilize liquid quenching, such as oil, water based polymers, or similar quenchants. It should be appreciated that subjecting the inner diameter to the above described procedure creates a hardened area 26 on bushing 16 as shown in FIG. 6a.

However, it should be understood that, if desired, the entire length of the inner diameter of bushing 16 does not have to be subjected to the above described hardening treatment. For example, in order to avoid treating the entire length of the inner diameter of bushing 16 the power to coil 54 may be selectively turned on and off as coil 54 travels through the passageway of bushing 16. In particular, as shown in FIG. 6b, the power to coil 54 may be selectively turned on and off so as to create (i) a first hardened area 26 which is positioned adjacent to a first end of the passageway of bushing 16 (coil 54 was energized when passing over this portion of the inner diameter), (ii) an untreated area positioned midway through the passageway of bushing 16 (coil 54 was not energized when passing over this portion of the inner diameter), and (iii) a second hardened area 26 which is positioned adjacent to a second end of the passageway of bushing 16 (coil 54 was energized when passing over this portion of the inner diameter). Thus it should be understood that selectively turning coil 54 on and off in the above described manner interposes the untreated area between the first hardened area 26 and the second hardened area 26.

It should be appreciated that the hardened area 26 is created such that it does not extend to such a depth as will cause hardened area 26 to abut hardened area 24. For example hardened area 26 can have a depth of about 5 millimeters. It should also be understood that treating inner diameter in the above described manner as a distinct step that is separate from treating the outer diameter facilitates the control over how deep hardened area 26 extends. In addition, utilizing a distinct and separate coil, i.e. coil 54, specifically configured to treat the inner diameter also enhances the control over how deep hardened area 26 extends. Limiting the depth of hardened area 26 in the above described manner results in an untreated layer 30 being interposed hardened area 24 and hardened area 26 as shown in FIGS. 6a and 6b. It should also be appreciated that the depth of hardened area 26 need not be of the same depth as the hardened area 24. It should further be appreciated that the hardness and depth of hardened area 26 should be kept at the lowest values which still prevent galling and wear of the inner diameter from contact with track pin 18. By keeping the hardened area 26 to a minimal thickness which still prevents galling and wear of the inner diameter of bushing 16, the hardened area 24 can have a greater depth while still maintaining the aforementioned untreated layer 30 interposed hardened area 24 and hardened area 26.

Treating the inner diameter and the outer diameter in the above described manner results in bushing 16 having three abutting cylindrical sections; hardened area 26, untreated layer 30, and hardened area 24.

To complete the hardening treatment of bushing 16, the areas at each end of the bushing 16 must be hardened in a manner similar to that described above for the inner diameter and the outer diameter. In particular, treatment of the areas at each end of bushing 16 utilizes a pancake type inductor as shown in FIG. 5. The bushing 16 is loaded on the vertical scanner such that (i) bushing 16 rests below a pancake type induction coil 58 and (ii) the end of bushing 16 to be treated is closest to the coil 58. Coil 58 can be a multi-turn inductor with a coil coupling of 0.040"–0.060". The inductor also has a spray quench associated therewith (not shown).

Once loaded in the above described manner, coil 58 is electrically coupled to a power supply 60 having the power and frequency which is proper for the metal of bushing 16. Such a power and frequency setting for the ends of bushing 16 is about 100–125 KW at about 25 KHz. The bushing 16 is then started rotating about its vertical axis 70 to ensure that all intended areas of the end of bushing 16 will be equally treated. An exemplary rotational speed is 100 rpm.

Once coil 58 is powered and bushing 16 is rotating, bushing 16 is elevated upward to coil 58. As the end of bushing 16 remains near the coil 58, it is heated due to induction from the coil 58 by a process herinbefore described. As stated above, the heating allows the metal to enter different phases of composition to arrive at a microstructure composition such as austenite. After the heating, the bushing 16 is quenched with the spray quench to arrest the phase transitioning at a desired microstructure, such as martensite. As hereinbefore noted, the quenching can be done by liquid quenching using oil, water based polymersquench, or similar quenchants. This treatment creates a hardened area 28 on the end of bushing 16.

The bushing 16 is then removed from the vertical scanner and rotated that the other end of the bushing 16 can be treated by coil 58 in a manner substantially identical as described above.

It should be appreciated that each hardened area 28 must each be of a depth so as to abut both the hardened area 26 and hardened area 24. It should also be appreciated that each hardened area 28 should not significantly extend into either hardened area 26 or hardened area 24. For example, hardened area 28 can have a depth of about 2 millimeters. An extension is deemed significant if it results in the creation of an exposed softened area in the hardened area 24 or hardened area 26. While somewhat of a softened area in the hardened area 24 and hardened area 26 is inevitable, minimizing the aforementioned created soft zone is necessary such that there is no area which is susceptible to galling.

It should be appreciated that treating the ends of bushing 16 in the above described manner as a distinct step that is separate from treating the inner and outer diameters facilitates the control over how deep hardened area 28 extends. In addition, utilizing a distinct and separate coil, i.e. coil 58, specifically configured to treat the ends of bushing 16 also enhances the control over how deep hardened area 28 extends. Accordingly, utilizing coil 58 in the above described manner ensures that the softened area created in the hardened area 24 and hardened area 26 by treating the ends of bushing 16 is kept to a minimum. This is in contrast to other procedures for hardening a work piece, such as bushing 16, which simultaneously treat the inner diameter and outer diameter, since these types of procedures provide less control over the resulting hardened areas (e.g. how deep the hardened areas extend and thus overlap). This is especially true when the simultaneous treatment of the inner and outer diameter of a bushing is relied upon to create a hardened area on the ends of a bushing.

Industrial Applicability

The above described hardening treatment results in bushing 16 having a hardened area 24, a hardened area 26, hardened areas 28, and an untreated layer 30 interposed hardened area 24 and hardened area 26. The hardened areas allow bushing 16 to wear less quickly on all treated exterior surfaces and thus increase its work life. In addition, by maximizing the depth of hardened area 24, bushing 16 will last longer than a bushing not treated by the above described process due to the fact that bushing 16 possesses a greater wear depth. Furthermore, hardened areas 28 impart wear resistance to the ends of bushing 16, including wear resistance to forces encountered in the assembly of track chain 10. Hardened areas 28 also prevent track seal wear and the creation of grooves in the end of the bushing 16. It should be understood that untreated layer 30 remains softer than hardened areas 24, 26, and 28 and as such enables bushing 16 to be resistant to the fatigue failure and brittle cracking that could result if bushing 16 did not have untreated layer 30 interposed hardened area 24 and hardened area 26.

Other aspects, objects and advantages of this invention can be obtained from a study of the drawings, disclosures, and the appended claims.

What is claimed is:

1. A method of hardening a work piece having (i) an outer surface, (ii) an inner surface which defines a passageway extending through said work piece, and (iii) an end, comprising the steps of:

advancing said work piece through a first induction coil such that a first hardened area is formed on said work piece;

advancing a second induction coil into said passageway of said work piece such that a second hardened area is formed on said work piece; and positioning a third induction coil adjacent to said end of said work piece such that a third hardened area is formed on said work piece, wherein said positioning said third induction coil step is performed after (i) said advancing said work piece through said first induction coil step and (ii) said advancing a second induction coil into said passageway step.

2. The method of claim 1, wherein:

said advancing said second induction coil into said passageway of said work piece step occurs after said advancing said work piece through said first induction coil step.

3. The method of claim 1, wherein:

said advancing said work piece through said first induction coil step occurs after said advancing said second induction coil into said passageway of said work piece step.

4. The method of claim 1, wherein:

said first hardened area is spaced apart from said second hardened area such that an untreated area is interposed said first hardened area and said second hardened area.

5. The method of claim 1, wherein:

said advancing said work piece through said first induction coil step includes the step of rotating said work piece around a longitudinal axis thereof.

6. The method of claim 5, wherein:

said advancing said second induction coil into said passageway of said work piece step includes the step of rotating said work piece around said longitudinal axis thereof.

7. The method of claim 1, wherein:

said third hardened area contacts said first hardened area and said second hardened area.

* * * * *